(12) United States Patent
Kalenkovich et al.

(10) Patent No.: US 9,092,410 B1
(45) Date of Patent: Jul. 28, 2015

(54) SELECTION OF POPULAR HIGHLIGHTS

(75) Inventors: Eugene Kalenkovich, Sammamish, WA (US); Janna Hamaker, Issaquah, WA (US); Tom Killalea, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1171 days.

(21) Appl. No.: 12/857,146

(22) Filed: Aug. 16, 2010

(51) Int. Cl.
 *G06F 17/00* (2006.01)
 *G06F 17/24* (2006.01)
 *G06F 3/0488* (2013.01)
(52) U.S. Cl.
 CPC .......... *G06F 17/241* (2013.01); *G06F 3/04883* (2013.01); *G06F 17/242* (2013.01)

(58) Field of Classification Search
 None
 See application file for complete search history.

(56) References Cited

U.S. PATENT DOCUMENTS

| | | | |
|---|---|---|---|
| 7,779,347 B2 * | 8/2010 | Christiansen et al. | 715/230 |
| 2004/0205542 A1 * | 10/2004 | Bargeron et al. | 715/512 |
| 2005/0273700 A1 * | 12/2005 | Champion et al. | 715/512 |
| 2009/0210779 A1 * | 8/2009 | Badoiu et al. | 715/230 |

* cited by examiner

*Primary Examiner* — Keith Bloomquist
(74) *Attorney, Agent, or Firm* — Lees & Hayes, PLLC

(57) ABSTRACT

Highlights from a community of users highlighting portions of an electronic digital content are analyzed and popular highlights determined. The popular highlights are then distributed to the users.

28 Claims, 12 Drawing Sheets

STARTING POINT SCORES
702

SCORE FOR EACH WORD POSITION

| ORIGIN WORD | 1 | 2 | 3 | 4 | 5 | 6 | 7 | 8 | ... | 13 | ... | 18 | TOTAL SCORE | RANK |
|---|---|---|---|---|---|---|---|---|---|---|---|---|---|---|
| 1 | 2.00 | - | 0.67 | - | - | 0.17 | - | 0.13 | - | 0.08 | - | 0.06 | 3.09 | 2 |
| 2 | 1.00 | - | 1.00 | - | - | 0.20 | - | 0.14 | - | 0.08 | - | 0.06 | 2.49 | 3 |
| 3 | 0.67 | - | 2.00 | - | - | 0.25 | - | 0.17 | - | 0.09 | - | 0.06 | 3.24 | 1 |
| 4 | 0.50 | - | 1.00 | - | - | 0.33 | - | 0.20 | - | 0.10 | - | 0.07 | 2.20 | 5 |
| 5 | 0.40 | - | 0.67 | - | - | 0.50 | - | 0.25 | - | 0.11 | - | 0.07 | 2.00 | 7 |
| 6 | 0.33 | - | 0.50 | - | - | 1.00 | - | 0.33 | - | 0.13 | - | 0.08 | 2.37 | 4 |
| 7 | 0.29 | - | 0.40 | - | - | 0.50 | - | 0.50 | - | 0.14 | - | 0.08 | 1.91 | 8 |
| 8 | 0.25 | - | 0.33 | - | - | 0.33 | - | 1.00 | - | 0.17 | - | 0.09 | 2.17 | 6 |
| 14 | 0.14 | - | 0.17 | - | - | 0.11 | - | 0.14 | - | 0.50 | - | 0.20 | 1.26 | 10 |
| 18 | 0.11 | - | 0.13 | - | - | 0.08 | - | 0.09 | - | 0.17 | - | 1.00 | 1.57 | 9 |

POPULAR HIGHLIGHT START POINT
704

ENDING POINT SCORES
706

SCORE FOR EACH POSITION

| ORIGIN | 7 | 8 | 9 | 10 | 11 | 12 | 13 | 14 | 15 | 16 | 17 | TOTAL SCORE | RANK |
|---|---|---|---|---|---|---|---|---|---|---|---|---|---|
| 7 | 1.00 | - | - | - | - | 0.17 | 0.14 | 0.13 | - | 0.10 | 0.09 | 1.63 | 7 |
| 8 | 0.50 | - | - | - | - | 0.20 | 0.17 | 0.14 | - | 0.11 | 0.10 | 1.22 | 11 |
| 9 | 0.33 | - | - | - | - | 0.25 | 0.20 | 0.17 | - | 0.13 | 0.11 | 1.19 | 12 |
| 10 | 0.25 | - | - | - | - | 0.33 | 0.25 | 0.20 | - | 0.14 | 0.13 | 1.30 | 10 |
| 11 | 0.20 | - | - | - | - | 0.50 | 0.33 | 0.25 | - | 0.17 | 0.14 | 1.59 | 8 |
| 12 | 0.17 | - | - | - | - | 1.00 | 0.50 | 0.33 | - | 0.20 | 0.17 | 2.37 | 4 |
| 13 | 0.14 | - | - | - | - | 0.50 | 1.00 | 0.50 | - | 0.25 | 0.20 | 2.59 | 1 |
| 14 | 0.13 | - | - | - | - | 0.33 | 0.50 | 1.00 | - | 0.33 | 0.25 | 2.54 | 2 |
| 15 | 0.11 | - | - | - | - | 0.25 | 0.33 | 0.50 | - | 0.50 | 0.33 | 2.03 | 6 |
| 16 | 0.10 | - | - | - | - | 0.20 | 0.25 | 0.33 | - | 1.00 | 0.50 | 2.38 | 3 |
| 17 | 0.09 | - | - | - | - | 0.17 | 0.20 | 0.25 | - | 0.50 | 1.00 | 2.21 | 5 |
| 18 | 0.08 | - | - | - | - | 0.14 | 0.17 | 0.20 | - | 0.33 | 0.50 | 1.43 | 9 |

POPULAR HIGHLIGHT END POINT
708

FIG. 7

| USER HIGHLIGHT | SUM FOR EACH POSITION | | | | | | | | | | | | | | | | | | TOTAL SCORE | RANK |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | | |
| A | - | - | 3.24 | - | - | - | 1.63 | - | - | - | - | - | - | - | - | - | - | - | 4.86 | 5 |
| B | - | - | - | - | - | - | - | 2.17 | - | - | - | - | - | - | - | - | 2.21 | - | 4.38 | 6 |
| C | 3.09 | - | - | - | - | - | - | - | - | - | - | - | 2.59 | - | - | - | - | - | 5.68 | 1 |
| D | - | - | - | - | - | 2.37 | - | - | - | - | - | - | - | 2.54 | - | - | - | - | 4.91 | 4 |
| E | - | - | 3.24 | - | - | - | - | - | - | - | - | 2.37 | - | - | - | - | - | - | 5.60 | 2 |
| F | 3.09 | - | - | - | - | - | - | - | - | - | - | - | - | - | - | 2.38 | - | - | 5.47 | 3 |
| G | - | - | - | - | - | - | - | - | - | - | - | - | - | - | - | - | - | 1.57 | 1.57 | 7 |

POPULAR HIGHLIGHT 1002

FIG. 10

SELECTION OF POPULAR HIGHLIGHTS

BACKGROUND

Electronic devices such as electronic book readers ("eBook readers"), cellular telephones, portable media players, tablet computers, netbooks, desktop computers, and the like may display digital content such as electronic books or other electronic media content to a user. Given the incredible growth in the availability of digital content, users are awash in information. For example, a single eBook reader may be capable of accessing a vast number of eBooks.

As a result, in the course of accessing content, users may highlight portions of the content considered relevant or interesting. These user highlights may be shared with other users in an online community. The sharing of highlights allows users new and exciting ways to interact with the content. For example, sharing of highlights provides useful feedback and a "Wisdom of the Crowds" effect to help identify particularly relevant or interesting parts of content. Unfortunately, the quantity, redundancy, and slight variations between different user highlights would soon overwhelm the user if all of the user highlights were presented.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 depicts calculated results and a determined ranking for highlight starting points and highlight ending points.

FIG. 10 depicts calculated results and a determined ranking when the user highlight is considered the popular highlight.

DETAILED DESCRIPTION

Figure 1:
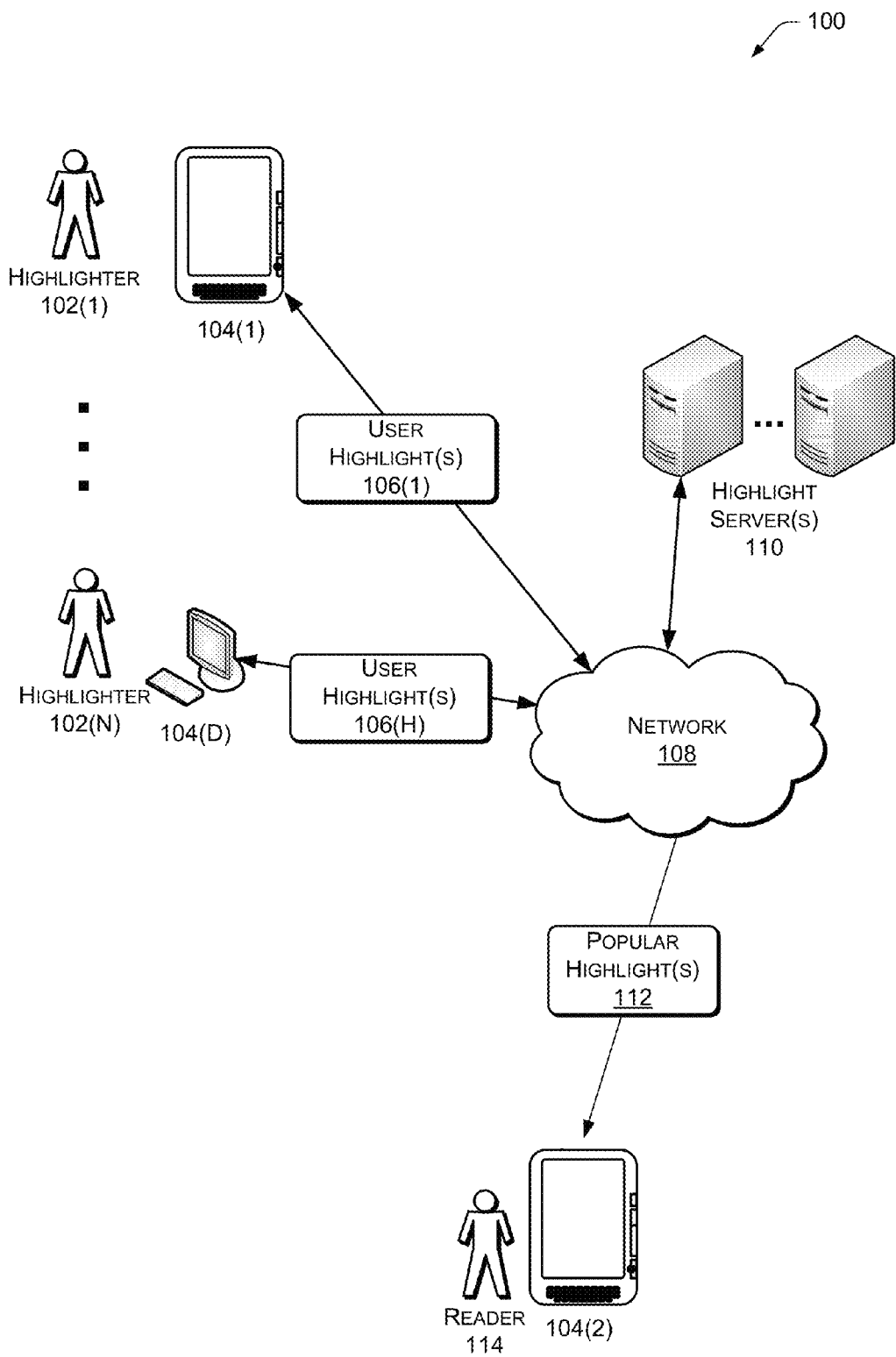
FIG. 1 is a block diagram of an illustrative network architecture configured to acquire user highlights and provide popular highlights to users.

As the quantity and availability of digital content has grown, so too has the volume of user highlights. While users may share highlights with one another in an online community, sharing of every highlight is problematic. The sheer quantity, redundancy, and slight variations between different user highlights might soon overwhelm users, with the user highlights possibly exceeding the content to which they refer. Furthermore, the presentation of too many highlights decreases the apparent value of a given highlight. For example, consider reading a printed book in which someone has highlighted almost every word on every page. Because everything is highlighted, the reader is left to wonder what is actually relevant or of particular interest.

This disclosure describes determination of popular highlights from a community collection of user highlights entered by users when consuming digital content. Various methods generate one or more popular highlights or select one or more user highlights for designation as popular highlights. The popular highlights are presented, rather than every user highlight, to thereby reduce redundancy, declutter the highlight data, and provide a meaningful emphasis on the passage which the highlight encompasses.

"Highlighting," as used herein, is the selection of a portion or interval of digital content, considered to be of interest or relevance to a user. Highlights may comprise highlight points such as a start point, a mid-point, and end point, and so forth. The interval of the highlight extends across one or more positions. The position is a location or designation within a stream of the digital content. The interval of the highlight thus extends from one relative location within the stream to another relative location. These positions may be individual characters, words, collections of multiple words, sentences, paragraphs, images, and so forth. The positions are independent of presentation of the digital content. For example, a highlight within an electronic book may appear in various spots on a display, such as during scrolling. The highlight describes the same interval, but is presented in different spots on the screen.

A highlight may be defined in several ways. For example, start and end points may define the highlight. Or the start point and a subsequent length may define the highlight. A signature or hash associated with the data in the highlighted portion may designate the highlight, and so forth. Highlights may either be user selected, entered automatically by monitoring usage characteristics such as dwell time on a passage, retrieved from physical highlights taken from a scanned physical document, and so forth.

A highlight server (or server) generates popular highlights by analyzing the user highlights collected over time from the community of users. Where multiple versions or editions of a book are in use, highlights may be synchronized across the versions. Position scores associated with highlight points, such as start points and end points within each user highlight, are generated. The position scores are proportional to a distance between a designated origin position and each of the highlight points. For example, a highlight point at the origin designated would result in a greater score than a highlight point ten positions distant. The position scores contribute at least in part to rankings which generate popular highlights.

In one implementation, the server considers highlight points such the start points and end points of the user highlights independently of one another. From among a plurality of highlight start points, a popular highlight start point is determined. Likewise, from among a plurality of highlight end points, a popular highlight end point is determined. When combined, the popular highlight start point and the popular highlight end point designate a popular highlight.

In another implementation, the server sums position scores for the start point and end point of each user highlight. The sum is compared to the sums of other user highlights, and a highest ranking user highlight is designated as the popular highlight.

Once the server selects a popular highlight, it identifies overlapping user highlights or user highlights which are adjacent to the popular highlight. The server then modifies these overlapping, adjacent, or both, user highlights in a highlight database. This modification may include removal, joining, and so forth. The user highlights associated with an individual user may remain intact. To protect the rights digital content owners, a maximum threshold for the quantity of a digital content displayed as popular highlights may be limited.

Once collected, a highlight user interface (HUI) may visually present the user highlights and the popular highlights to a user on an electronic device. The HUI may indicate highlights and their relative ranking, for example, using different colors and/or intensities of color.

While popular highlights are described in the context of textual content, the concepts described herein are also applicable to highlighting of sections of other digital content, such as audio recordings, video recordings, or the like. Also, while processes are described as being implemented using eBook reader devices, digital content may be highlighted and/or displayed by electronic devices of an eBook other than eBook reader devices, such as cellular telephones, portable media players, tablet computers, netbooks, notebooks, desktop computers, and the like.

Popular Highlight Architecture

FIG. 1 is a block diagram of an illustrative network 100 configured to acquire user highlights, determine the most popular among them, and then provide the popular highlights to users. A user who adds highlights to digital content is a "highlighter." Illustrated are several highlighters 102(1) through 102(N). Each user may have one or more devices 104(1) through 104(D). The devices 104 may include electronic book reader devices 104(1) and personal computers 104(D), however other devices such as laptops, netbooks, media players, smartphones and so forth are also possible.

Each highlighter 102 may generate user highlights 106(1) through 106(H) amongst their respective copies of a digital content, or a commonly accessible single copy, via the device 104. The highlight describes a portion considered of interest within the content.

The device 104 may communicate via a network 108 to a highlight server 110. The network 108 may comprise the Internet, a cable television network, wireless network, wired network, wireless wide area network, etc. The highlight server 110 may comprise a single server, cluster of servers, data center, and so forth.

The highlight server 110 generates one or more popular highlights 112, based at least in part upon the user highlights 106(1)-(H) received from the highlighters 102(1)-(N). The popular highlights 112 comprise a selected subset of user highlights for the digital content. This subset may have maximum size limitations, or content limitations. For example, the popular highlights may provide no more than a predetermined percentage (e.g., two percent) of a body of the digital content to comply with conditions set forth by the owner of intellectual property rights in the digital content. Alternatively, the owner of the digital content may choose to opt out of permitting popular highlights altogether. In another example, popular highlights from a portion of a digital content may be restricted or prohibited. For example, highlights in a last chapter revealing the solution in a mystery novel may not be displayed, or be hidden until clicking to view a "spoiler" highlight.

The highlight server 110 may then provide the popular highlights 112 to the community of users, including the highlighters 102(1)-(N) and a reader 114. A reader 114 is a user who does not choose to, or is not permitted to, enter user highlights 106 for the digital content and hence may not be considered a "highlighter." In this illustration, the reader 114 has a device 104(2) that receives the popular highlights 112 via the network 108 from the highlight server 110. The transfer of highlights may be initiated by the device 104 (as a "pull" of data), by the server 110 (as a "push" of data), or a combination. The device 104 then presents the digital content, the popular highlights 112, or both to the reader 114.

Figure 2:
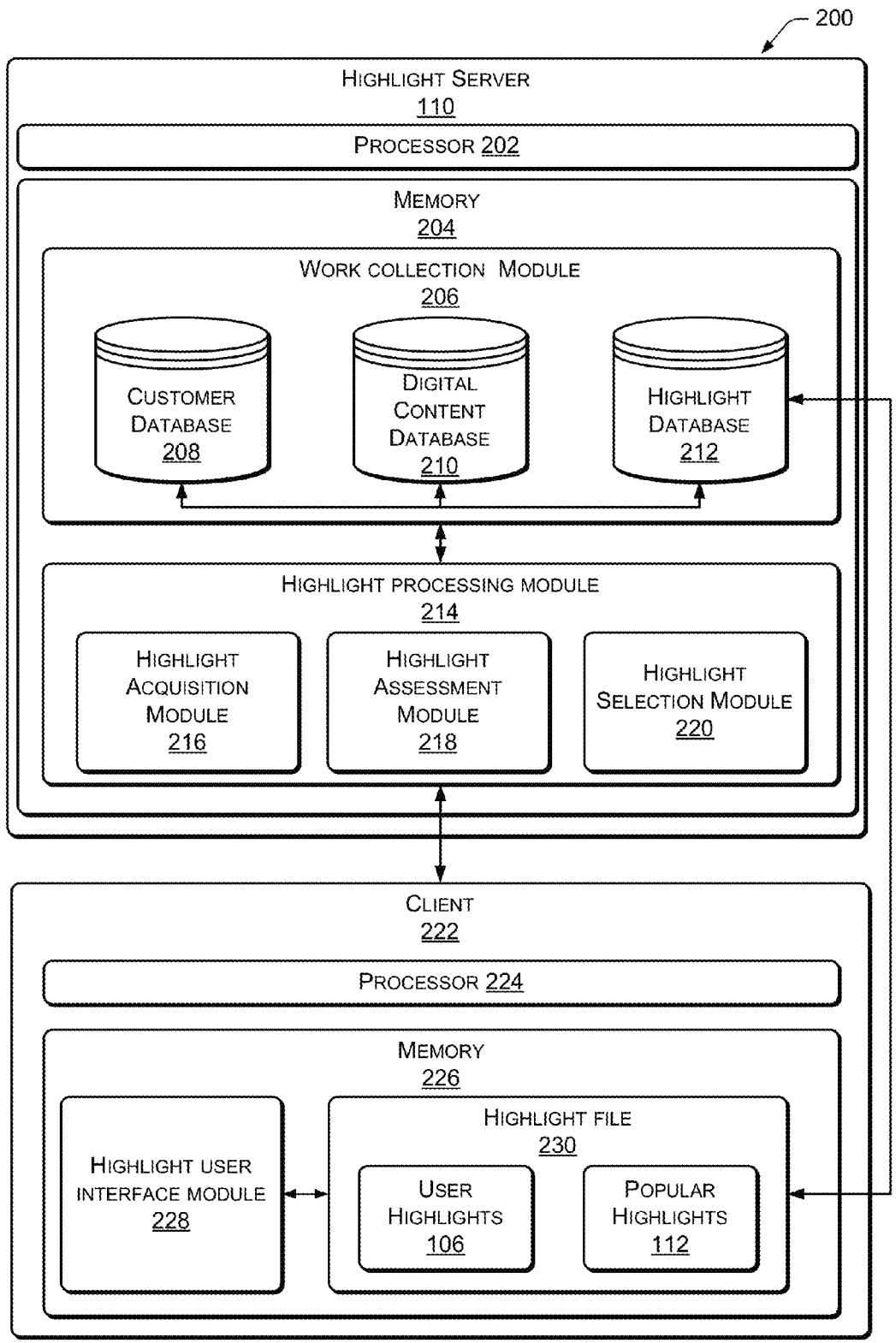
FIG. 2 is a block diagram of an illustrative architecture of a popular highlight environment.

FIG. 2 is a block diagram of an illustrative popular highlight environment 200. The highlighting environment 200 includes one or more servers 110, comprising a processor 202 and a memory 204. The memory 204 may include computer-readable storage media (CRSM). The CRSM may be any available physical media that can be accessed by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Stored in the memory 204 is a digital content collection module 206. The digital content collection module 206 may comprise a customer database 208, a digital content database 210, and a highlight database 212, coupled to one another. The customer database 208 comprises information about users participating in the community. The digital content database 210 comprises digital content, for example music, books, movies, and so forth. Digital content may be accessed in common. That is, each user with access to a particular content may access a common copy of that content, or each user may access their own discrete copy of content stored in a digital locker. The highlight database 212 may comprise highlighted intervals of digital content, including those deemed to be popular highlights, a version or edition number of the digital content which the highlights are for, and so forth.

A highlight processing module 214 is also present within memory 204 and coupled to digital content collection module 206. The highlight processing module 214 comprises a highlight acquisition module 216, a highlight assessment module 218, and a highlight selection module 220. The highlight processing module 214 processes highlights from highlighters 102(1)-(N) to create popular highlights for use by the community. The highlight acquisition module 216 acquires the user highlights 106(1)-(H) from the highlighters 102(1)-(N). The highlight assessment module 218 determines scores based at least in part upon the user highlights 106(1)-(H). The highlight selection module 220 utilizes the scores to select one or more popular highlights 112.

The highlight processing module 214 is in communication with a client 222, which may represent any one of the devices 104 shown in FIG. 1. The client 222 comprises a processor 224 and a memory 226. The memory 226 may include computer-readable storage media as described above. Stored in the memory 226 is a highlight user interface (HUI) module 228. The HUI module 228 may present user highlights 106 or popular highlights 112 stored in the memory 226, or a portion thereof, or retrieved from the server 110, depending on highlight viewing rights the user may have. In some implementations, highlights may be retrieved from the highlight database 212. Additionally, the user of the client 222 may have highlight submission rights, allowing the user to submit highlights to the server 110 for inclusion in the highlight database 212. When a user has highlighting rights, a highlight file 230 may comprise highlights made of the digital content on the client 222. The highlight file 230 stored in the memory 226 may be provided to the server 110 for incorporation into the highlight database 212.

User Highlights

Figure 3:
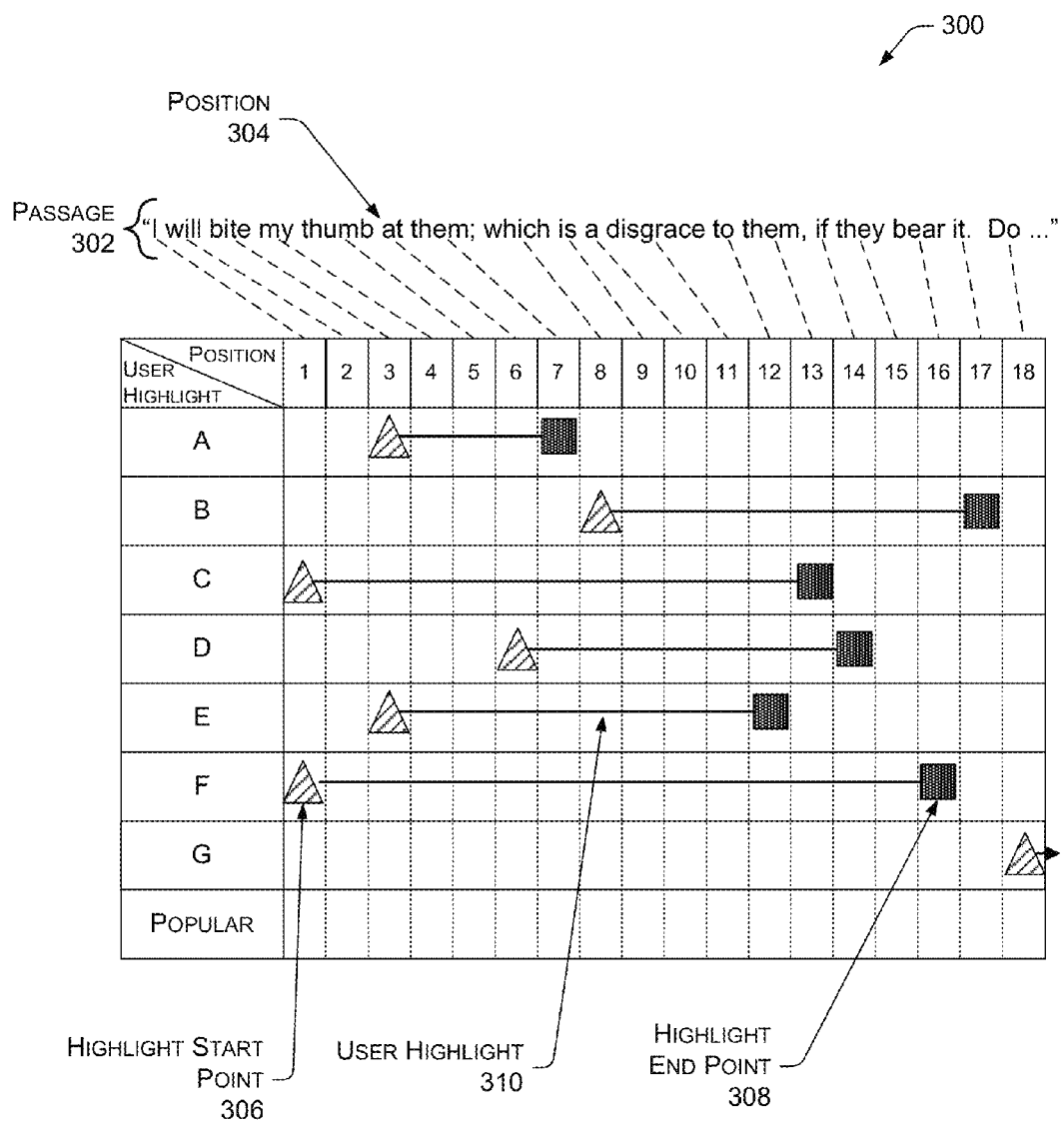
FIG. 3 is a highlight diagram depicting an illustrative passage and user highlights from several users, along with a popular highlight derived at least in part from the user highlights when the start and end points for each user highlight are considered independently of one another.

FIG. 3 is a highlight diagram 300 depicting an illustrative passage and user highlights from several users. Shown is a passage 302 from the book Romeo and Juliet: "I will bite my thumb at them; which is a disgrace to them, if they bear it." In this example, each position 304 designates a word. For example, position five is the word "thumb" while position eleven is the word "disgrace." In other implementations, positions may be associated with individual characters, words, collections of multiple words, sentences, paragraphs, images, and so forth.

The highlight diagram 300 shows a matrix with positions 1-18 extending horizontally which correspond to the passage 302 and user highlights A-G extending vertically. The user highlights A-G may be from a single user or a plurality of users. For simplicity of illustration and not by way of limitation, seven user highlights A-G and eighteen positions are shown.

Within the highlight diagram 300, highlights are shown as intervals having a start point and an end point. In this illustration, user highlight start points 306 are designated with triangles, while highlight end points 308 are designated with squares. A horizontal line between these points designates the interval encompassed by the highlight. For example, arrow 310 indicates that user highlight E extends from a start point of position 3 (i.e., corresponding to the word "bite") to an end point of position 12 (i.e., corresponding to the word "to").

Given the sample of seven highlights A-G within this one passage 302, it is apparent that displaying the user highlights from the community would result in clutter and distraction. This is particularly so when the community may extend to thousands of users, or more, many of whom may be highlighting this particular passage. Thus, it is beneficial to generate one or more popular highlights as described next, to which attention of the user's may be drawn.

The highlight diagram 300 visualizes the various user highlights from which a popular highlight is derived. Specifically, the seven user highlights A-G are considered in the determination of the popular highlight as described next.

Figure 4:
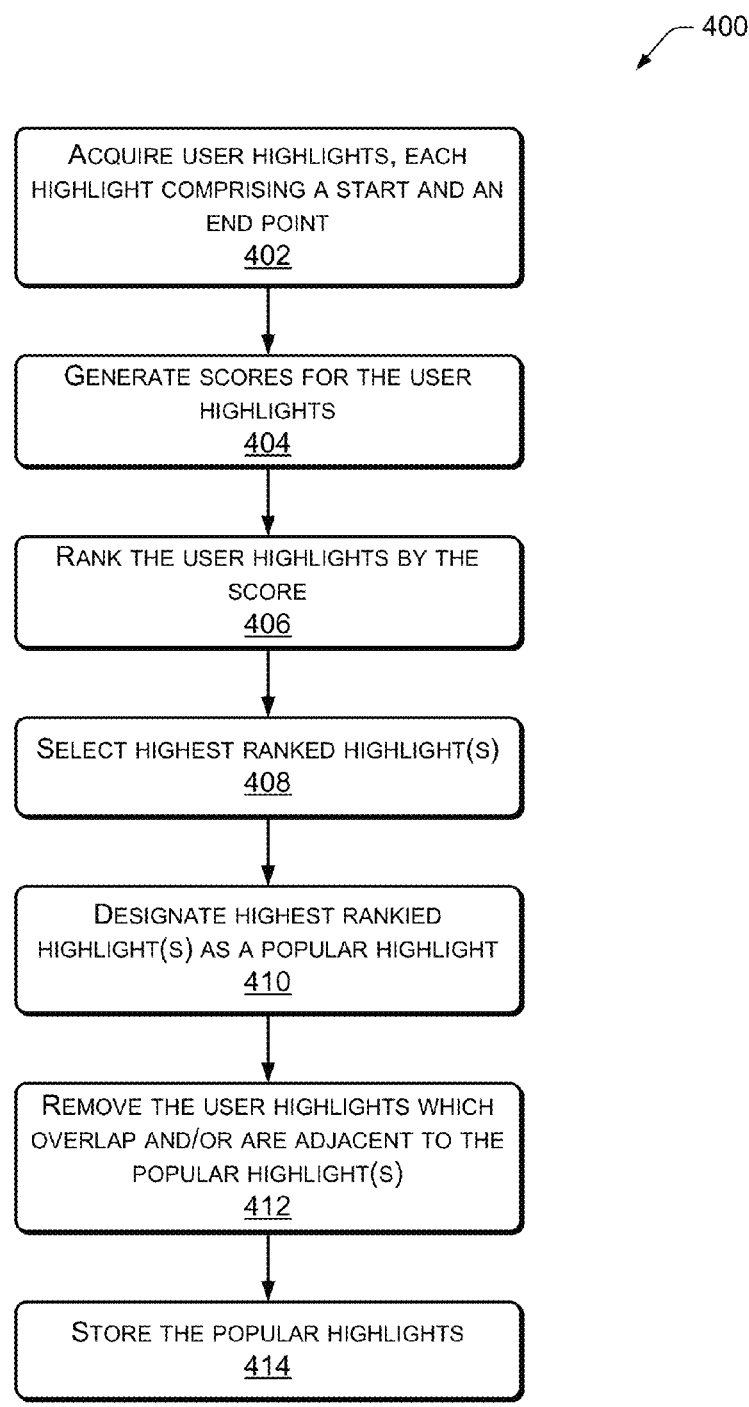
FIG. 4 is a flow diagram of an illustrative process of determining popular highlights.

FIG. 4 shows an illustrative process 400 of determining popular highlights. The process 400 (as well as processes described below with respect to FIGS. 5, 6, and 9) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 (as well as processes 500, 600, and 900) is described with reference to the architectures of FIGS. 1-2 and the highlight diagram of FIG. 3.

At 402, the highlight processing module 214 acquires a plurality of user highlights 106(1)-(H). Each highlight comprises highlight point types. Highlight point types comprise a highlight start point 306, a mid-point, a highlight end point 308, and so forth. The highlight points define an interval of the highlight across one or more positions in the content.

At 404, the highlight processing module 214 generates a score for the plurality of user highlights 106, such as user highlights A-G as shown in FIG. 3. Highlight points may be scored for each position in the digital content, as will be described below in more detail with respect to FIG. 5. A relative proximity of other highlight points may contribute to at least a portion of the score.

At 406, the highlight processing module 214 ranks the user highlights 106, such as the user highlights A-G, by score. For example, the scores may be sorted in descending order of highest score to lowest score, and assigned a numerical rank.

At 408, the highlight processing module 214 selects a highest ranked highlight. In some implementations, a top k (where k is a non-zero integer) number of highest ranked highlights may be selected. For example, a top five highest ranked highlights may be selected. At 410, the highlight processing module 214 designates the highest ranked highlight as a popular highlight 112.

Because the popular highlight 112 is considered to represent the community's assessment of a passage of particular interest or relevance, the user highlights 106(1)-(H) may be removed from the highlight database 212. At 412, the highlight processing module removes at least a portion of user highlights 106 which overlap or are adjacent to the popular highlight 112. This removal may comprise deletion, masking from future consideration, reducing scoring weight, and so forth.

Two or more highlights overlap when their respective highlight intervals share one or more common positions. A pre-determined overlap threshold may be used to limit which user highlights are removed. For example, the pre-determined overlap threshold may be set to two positions, inclusive, resulting in a highlight having an overlap of two positions being removed. For example, as shown in FIG. 3, user highlights A and D overlap by two positions (i.e., 6 and 7). The pre-determined overlap threshold may be static or dynamically configured. For example, the pre-determined overlap threshold may be varied in response to a ratio comprising highlight length to passage length is less than one.

The highlight processing module 214 is also configurable to remove user highlights 106 adjacent to the popular highlight 112. Two highlights are adjacent to one another when their respective points (such as start points and end points) are within a pre-determined adjacency distance of the popular highlight. For example, suppose the pre-determined adjacency distance is three positions, inclusive. As shown in FIG. 3, the user highlight G starts two positions away from the end of the user highlight F, which is within the pre-determined adjacency distance. Thus, user highlights F and G are deemed adjacent to one another. When the user highlight 106 is within the pre-determined adjacency distance of the popular highlight 112, the user highlight 106 may be removed. Removal of the user highlights 106 adjacent to the popular highlight 112 removes clutter and improves presentation and relevance to the user.

At 414, the highlight processing module 214 stores the popular highlights 112. The popular highlights 112 may be stored in the highlight database 212, the highlight file 230, and so forth. Once stored, the user may access the popular highlights 112 to see portions of the digital content considered relevant or interesting by the community.

In some implementations all or a portion of the process 400 may be iterated. For example, when a top k (where k is a non-zero positive integer) number of popular highlights are desired, the process may iterate to select and designate the top k popular highlights.

Generating Position Scores

Figure 5:
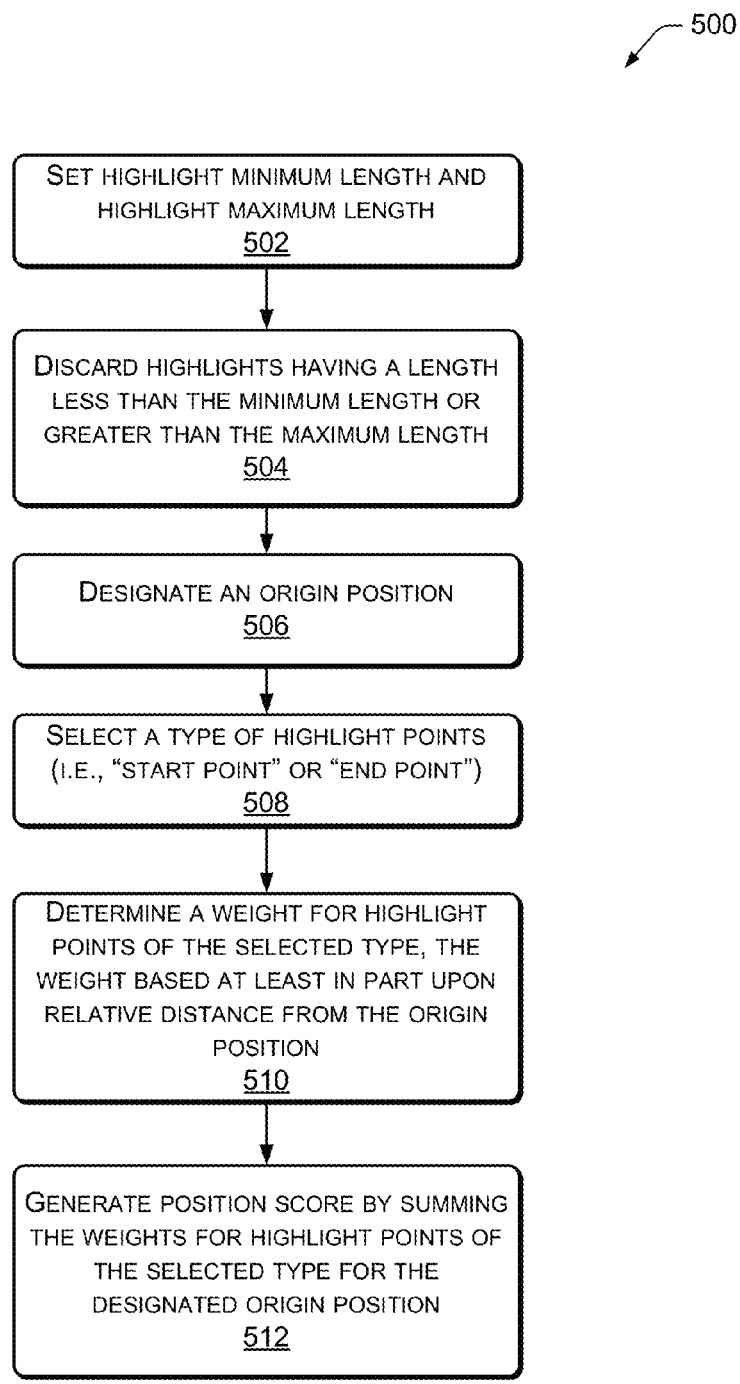
FIG. 5 is a flow diagram of an illustrative process of generating position scores associated with user highlights.

FIG. 5 is a flow diagram of an illustrative process 500 of generating position scores. Scoring assigns a numerical value to the user highlight 106, or to portions thereof, such as the highlight points. At 502, a highlight minimum length and a highlight maximum length are set within the highlight assessment module 218. Minimum and/or maximum lengths for individual highlights or other thresholds may be pre-determined or dynamically adjusted. For example, non-fiction programming books might have a minimum highlight length greater than that of fictional books. Highlight length thresholds may also be determined dynamically, taking into account some book-specific characteristics. For example, a book with a low Flesch-Kincaid readability score may have a minimum highlight length that is less than a book with a high Flesch-Kincaid readability score.

At 504, the highlight assessment module 218 discards (or otherwise disregards) the highlights having a length less than the minimum length, greater than the maximum length, or both. This removes individual user highlights 106 which may be too expansive or to brief to be considered useful as a popular highlight 112.

At 506, the highlight assessment module 218 designates an origin position. Positions comprise individual characters, words, sentences, paragraphs, images, and so forth. For example, where positions designate words, a first position is the first word. An origin position is a designated position from which a distance used in position scoring is measured. The positional distance from highlight points to the origin position is used, at least in part, to generate the scores associated with the highlights and highlight points. In some implementations, the origin position is incremented throughout the digital content, building a score for each position.

At 508, the highlight assessment module 218 selects a type of highlight point. Highlights may comprise highlight points such as a start point, a mid-point, and end point, and so forth. Types of highlight points thus include start points, mid-points, end points, and so forth.

At 510, the highlight assessment module 218 determines weights for the highlight points of the selected type. In some implementations, this weight is proportionate based at least in part upon a relative distance from the origin position to the highlight point. For example, a greater score is accorded to highlight points closer to the origin than highlight points which are more distant. The weight may incorporate a decay function using the relative distance. This decay function may be linear, exponential, logarithmic, and so forth. In some implementations a pre-determined maximum distance for calculation of the highlight point weight may be set. For example, the pre-determined maximum distance for calculation may be twelve positions away from the origin, disregarding highlight points more distant than this.

At 512, the highlight assessment module 218 generates a position score by summing the weights for highlight points of the selected type for the designated origin position. For example, suppose start points are the selected type of highlight points. The position score for origin position one includes the sum of start points in the origin position plus the proportionate scores of start points in other positions. Likewise, similar position scores may be generated for mid-point, end-point, and other types of highlight points.

Ranking Start and End Points Independently

Figure 6:
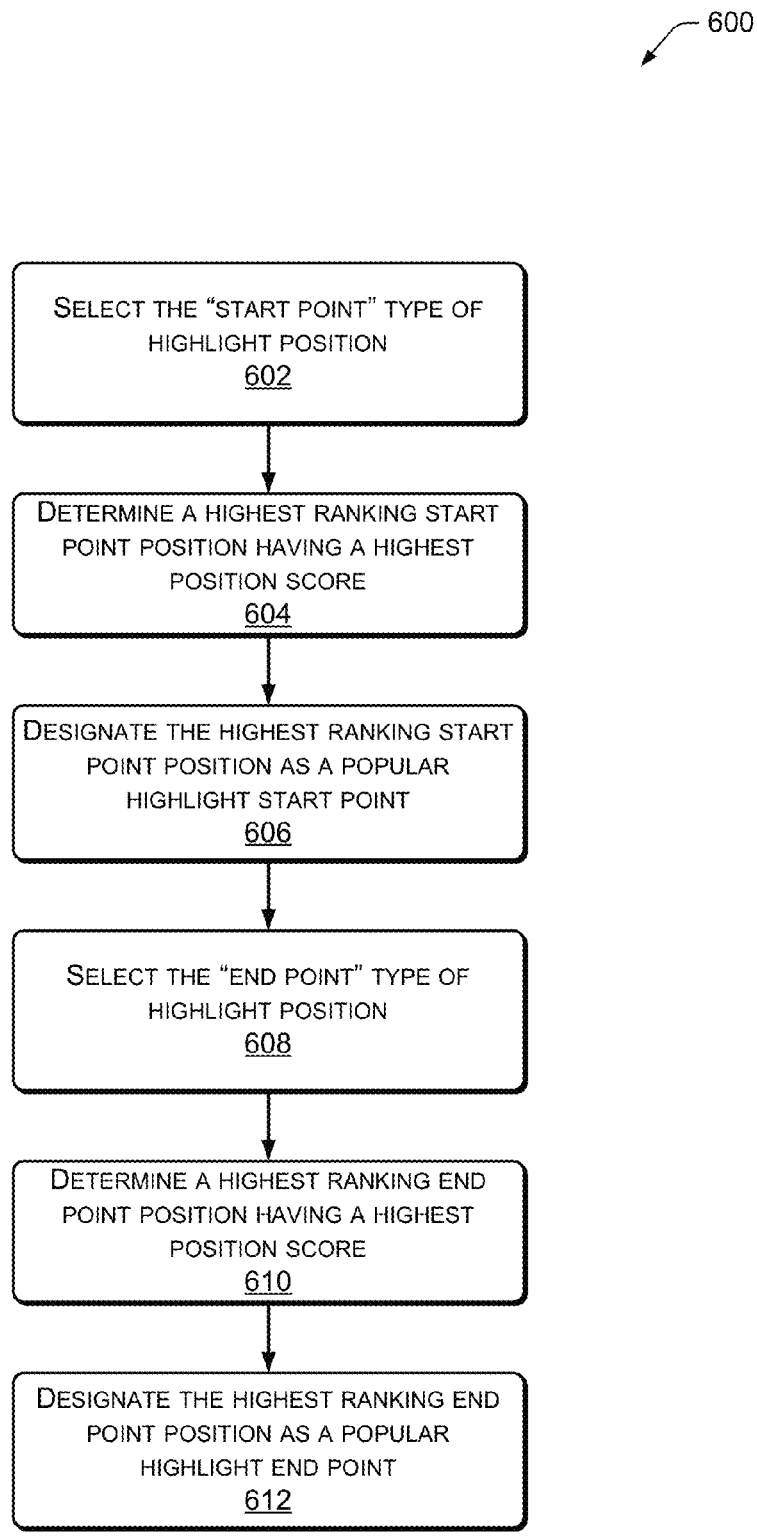
FIG. 6 is a flow diagram of an illustrative process of ranking user highlights such that start and endpoints of user highlights are considered independently of one another.

FIG. 6 is a flow diagram of an illustrative process 600 of ranking user highlights such that start and end points of user highlights are considered independently of one another. At 602, the highlight selection module 220 selects the "start point" type of highlight position. At 604, a highest ranking start point position having a highest position score is determined. In one implementation, the highest ranking position score in a list of position scores for the start point type of highlight position is found. At 606, the position corresponding to this highest ranking position score is designated as a popular highlight start point.

At 608, the end point type of highlight position is selected. At 610, the highlight selection module 220 determines a highest ranking end point position having a highest position score. At 612, the highest ranking end point position is designated as a popular highlight end point. Thus, the highlight selection module 220 may be configured to determine the start and end points for the user highlights 106 independently of one another.

FIG. 7 depicts calculated results 700 for generating position scores and ranking highlight starting points and highlight ending points of the highlights of FIG. 3. Starting point scores 702 are shown for the starting points shown in FIG. 3. In this example, position scores were calculated as described above with respect to FIG. 6. For example, in one implementation an origin position is designated. A count is made for each position of a selected highlight type and summed to form C. A score for each position is calculated by the following equation, where $C_p$ is the sum of counts for the selected highlight type at position P and D is the absolute distance between P and the origin position.

$$\text{Position Score} = C_P \frac{1}{D+1} \quad \text{(Equation 1)}$$

For example, assume an origin position of the third word, "bite." Start highlights as shown are present at positions 1, 3, 6, 8, 13, and 18 with counts of 2, 2, 1, 1,1, and 1, respectively. Given the positions and counts above and the origin position, at position 3 the position score=2*(1/(0+1)=2. Likewise, at position 6, the position score=1*(1/(3+1))=0.25. Thus, highlights which are farther away from the origin position are weighted proportionately less. In other implementations, other algorithms may be used to calculate the position scores.

As shown here, when the origin is position is 3, the total score of 3.24 is the greatest of the starting point total scores the positions calculated for the highlights shown in FIG. 3. Thus, the first ranked position 3 is a popular highlight start point 704.

Similarly, ending point scores 706 are shown for the ending points shown in FIG. 3, and are calculated in a similar fashion. This table indicates that for highlight ending points, when position 13 is the origin, the highest score of 2.59 is achieved. Thus, position 13 is a popular highlight end point 708.

Figure 8:
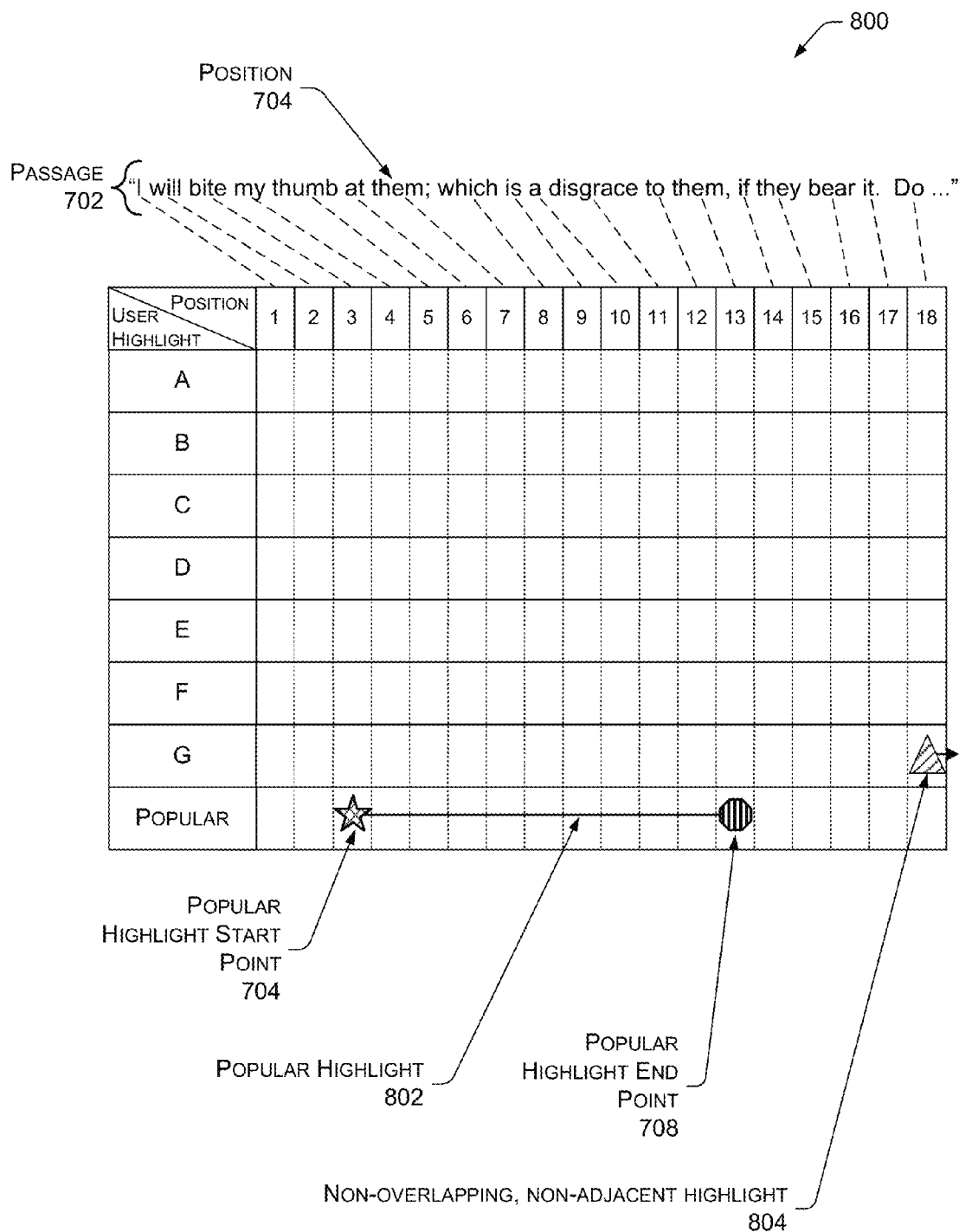
FIG. 8 is a highlight diagram depicting a popular highlight for the illustrative passage of FIG. 7 and after overlapping and/or adjacent user highlights have been removed.

FIG. 8 is a highlight diagram 800 depicting a popular highlight for the illustrative passage after overlapping and adjacent user highlights have been removed. The popular highlight start point 704, designated with a star, and the popular highlight end point 708 designated with an octagon, as determined above define a popular highlight 802. As shown, the popular highlight 802 extends from position 3 to position 13. Consider that the popular highlight 802 as shown does not correspond directly to any of the user highlights A-G. This is because the popular highlight 802 has been generated using the process set forth in FIG. 6 where start and end points for each user highlight are considered independently of one another.

User highlights A-G that overlapped the popular highlight 802 have been discarded. Also shown is user highlight G with a start position of 18 and extending to the right. The user highlight G is outside of a pre-determined adjacency distance, in this example three, of the popular highlight 802. Thus, user highlight G remains.

As a result of the removal of user highlights which overlap, which are within a pre-determined adjacency distance, or both, the highlights are decluttered. The removal process may be iterated as more user highlights or popular highlights are considered.

Designating a User Highlight as a Popular Highlight

Figure 9:
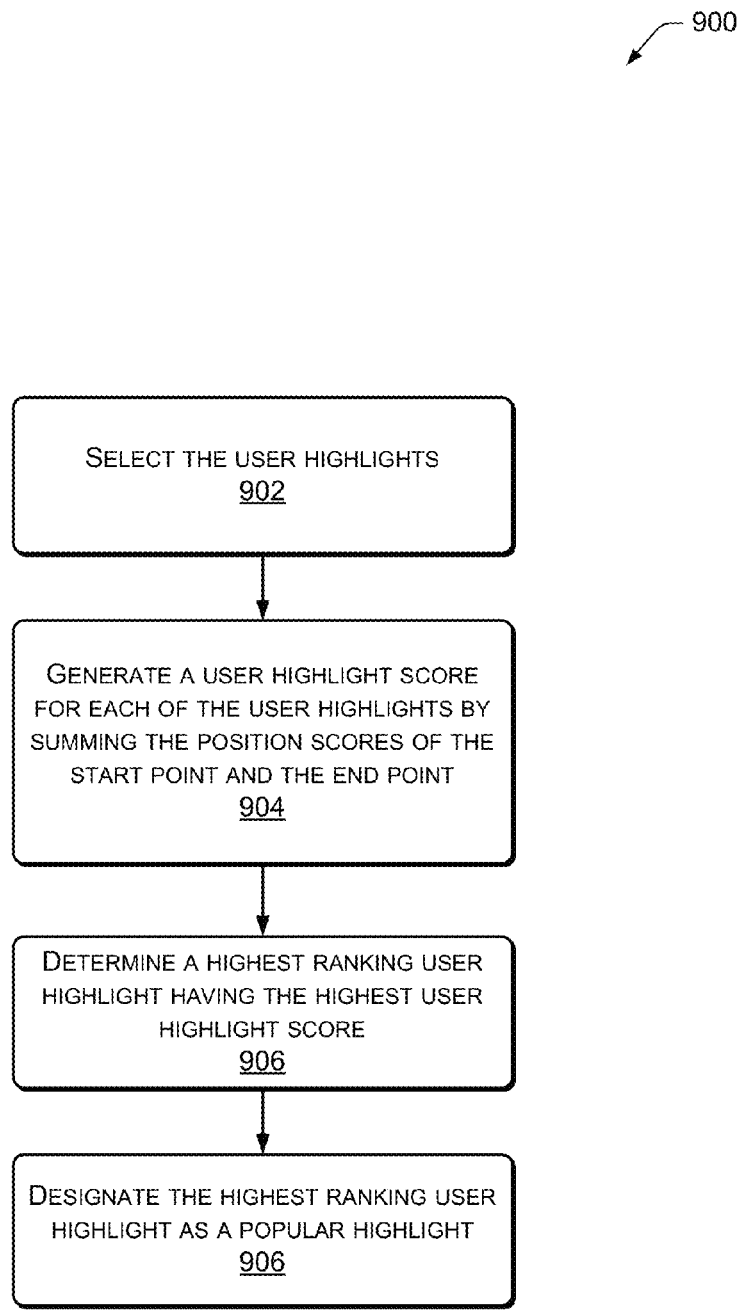
FIG. 9 is a flow diagram of an illustrative process of ranking user highlights such that the scores of start and endpoints for each user highlight are considered together.

FIG. 9 is a flow diagram of an illustrative process 900 of ranking user highlights such that the scores of start and endpoints for each user highlight are considered together. At 902, the user highlights 106 are selected. For example, consider the highlights A-G of FIG. 3. At 904, the highlight selection module 220 generates a user highlight score for each of the user highlights 106 by summing the position scores of the start point and the end point. The generation of position scores is described in more detail above with respect to FIG. 5 with calculated results shown in FIG. 7.

At 906, the highlight selection module 220 determines a highest ranking user highlight having the highest user highlight score. At 908, the highest ranking user highlight is designated as a popular highlight 112.

This process allows the selection of a highlight made by one of the users, which may provide a more coherent highlight. As a result of this selection process, a highlight by a single user out of many may be designated as a popular highlight.

FIG. 10 depicts calculated results 1000 when start and endpoints of user highlights are considered together. As described above with respect to FIG. 9 and FIG. 3, user highlight scores may be generated by summing the position scores of the start points and end points for each of the user highlights A-G. For example, user highlight C has a start point of position 1 and an end point of position 13. As shown in the calculated results 1000 and as described above with regards to FIG. 8, position 1 has a calculated position score of 3.09. Likewise position 13 has a calculated position score of 2.59. When summed, 3.09+2.59=5.68 results in highlight C having the highest rank. Thus, highlight C which begins at position 1 and ends at position 13 is designated as a popular highlight 1002.

Figure 11:
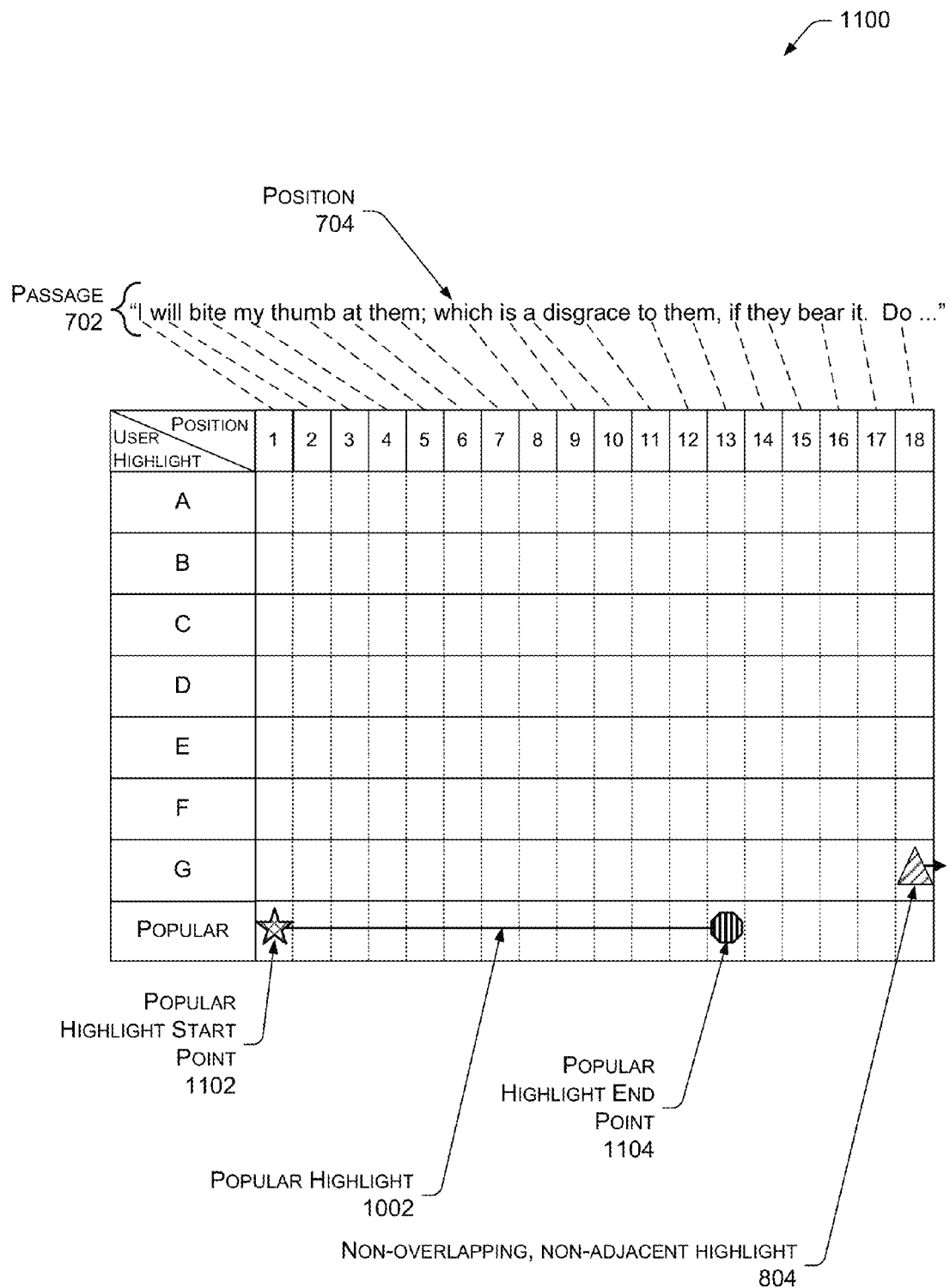
FIG. 11 is a highlight diagram depicting the popular highlight for the illustrative passage of FIG. 3 and after overlapping user highlights have been removed.

FIG. 11 is a highlight diagram 1100 depicting the popular highlight 1002 derived at least in part from the user highlights of FIG. 3 when start and endpoints of user highlights are considered together. In this illustration, the popular highlight 1002 begins with popular highlight start point 1102 in position 1 and ends with popular highlight end point 1004 in position 13. The popular highlight 1002 corresponds to the user highlight C, and differs from the popular highlight 802 of FIG. 8. This difference occurs because the popular highlight 1002 considers each of the user highlights A-G as entities, as described with regards to FIG. 9.

As described above with respect to FIG. 8, overlapping and/or adjacent user highlights have been removed. As a result, the highlights are decluttered, allowing easier user access and improving the import of the popular highlight 1002. Also as described above, the non-overlapping, non-adjacent highlight 804 remains as well.

Highlight User Interface (HUI) with Designated Popular Highlights

Figure 12:
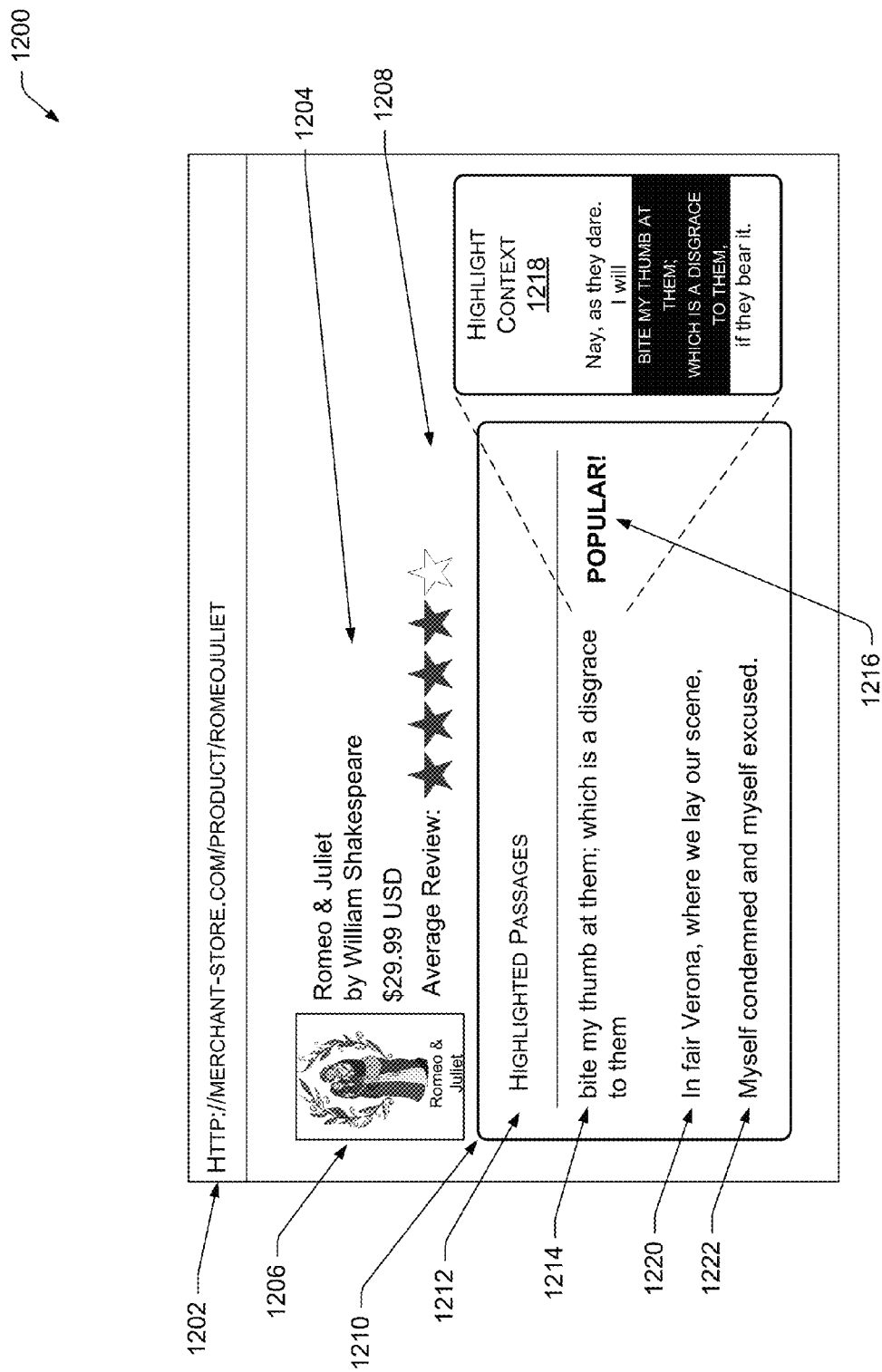
FIG. 12 depicts an illustrative browser interface showing popular highlights in an electronic book.

FIG. 12 depicts an illustrative browser interface 1200 showing highlights in an electronic book, and distinguishing those highlights deemed to be popular. A web address 1202 is shown in the browser interface to access an online merchant store selling books or popular highlights or both. Details about an illustrative book are presented to the user, including title, author, and price 1204. A thumbnail picture of the book's cover 1206 is also shown. An indication of user reviews of the book 1208 may also be presented.

A highlight viewing interface 1210 may present highlighted passages of selected digital content. An indication of the highlighted passages 1212 is presented to the user. This may include a popular highlight 1214, which may be designated as such with a popular highlight indicator 1216 comprising a legend, an icon, text, formatting, and so forth. Additional highlight context 1218 information is shown, such as in response to a user activating a control. The additional user context 1218 may provide a larger excerpt, such as the passage, statistics about the highlight, and so forth.

Also presented are other highlights, such as user highlights 1220 and 1222, which may be associated with the particular user accessing the browser interface 1200. Thus, the user may access popular highlights as well as their own. In some implementations, a graphic display showing the relative location of highlights within a representation of the content may be presented.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

What is claimed is:

1. A method of generating popular highlights of an electronic book from a plurality of user highlights, the method comprising:
    acquiring a plurality of user highlights made to an electronic book by a plurality of users, individual user highlights comprising a start point and an end point which describe an interval across one or more positions within the electronic book;
    generating scores for the plurality of user highlights, the generating comprising:
        selecting start points or end points of the user highlights;
        designating a position in the electronic book as an origin position;
        determining a weight for the start points or end points, the weight based at least in part upon a relative distance from the origin position to a given start or end point;
    generating a position score for the origin position by summing the weights for start points or end points for the designated origin position;
    ranking the plurality of user highlights by the position score;
    selecting the user highlight that is ranked highest; and
    designating the highest ranking highlight as a popular highlight.

2. The method of claim 1, further comprising iterating the selecting the user highlight that is ranked highest and designating the highest ranking highlight for a pre-determined number of times to designate a plurality of popular highlights.

3. The method of claim 1, further comprising:
setting a highlight minimum length and a highlight maximum length; and
discarding the user highlights having a length less than the highlight minimum length or a length greater than the maximum length.

4. The method of claim 1, wherein the selecting the user highlight that is ranked highest further comprises:
selecting a start point type of highlight point;
determining a highest ranking start point position having a highest start position score;
designating the highest ranking start point position as a popular highlight start point;
selecting an end point type of highlight point;
determining a highest ranking end point position having a highest end position score; and
designating the highest ranking end point position as a popular highlight end point.

5. The method of claim 1, wherein the selecting the user highlight that is ranked highest further comprises:
selecting each of the user highlights;
generating a user highlight score at least in part by summing the position scores of the start point and the end point of the selected user highlight;
determining a highest ranking user highlight having the highest user highlight score; and
designating the highest ranking user highlight as a popular highlight.

6. The method of claim 1, further comprising displaying the popular highlight via an electronic book reader.

7. The method of claim 1, further comprising removing user highlights which overlap the popular highlight.

8. The method of claim 1, further comprising combining one or more user highlights which overlap the popular highlight.

9. The method of claim 1, further comprising removing adjacent user highlights which have a start point, an end point, or both within a pre-determined adjacency distance of the popular highlight.

10. The method of claim 1, further comprising presenting the popular highlight for display.

11. A non-transitory computer-readable storage media storing instructions that when executed instruct a processor to perform acts comprising:
accessing a plurality of user highlights made to an electronic book by a plurality of users, an individual user highlight of the plurality of user highlights comprising a start point and an end point that denote an interval across two or more positions within the electronic book;
for the individual user highlight of the plurality of user highlights, generating a first score for the start point and a second score for the end point based at least in part on at least two user highlights of the plurality of user highlights, the generating comprising:
determining a first start point weight, the first start point weight being a weight for a first start point of a first user highlight of the at least two user highlights of the plurality of user highlights for at least a first position of the two or more positions;
determining a second start point weight, the second start point weight being the weight for a second start point of a second user highlight of the at least two user highlights of the plurality of user highlights for the at least the first position of the two or more positions;
determining a first end point weight, the first end point weight being the weight for a first end point of the first user highlight of the at least two user highlights of the plurality of user highlights for at least a second position of the two or more positions;
determining a second end point weight, the second end point weight being the weight for a second end point of the second user highlight of the at least two user highlights of the plurality of user highlights for the at least the second position of the two or more positions;
generating a start point position score for the at least the first position of the two or more positions by summing the first start point weight for the at least the first position of the two or more positions and the second start point weight for the at least the first position of the two or more positions;
generating an end point position score for the at least the second position of the two or more positions by summing the first end point weight for the at least the second position of the two or more positions and the second end point weight for the at least the second position of the two or more positions;
ranking the start point position score for the at least the first position of the two or more positions;
ranking the end point position score for the at least the second position of the two or more positions;
designating the start point corresponding to a highest ranking start point position score as a popular start point;
designating the end point corresponding to a highest ranking end point position score as a popular end point; and
determining a popular highlight according to the popular start point and the popular end point.

12. The non-transitory computer-readable storage media of claim 11, further comprising instructions that when executed, instruct a processor to perform acts comprising:
setting a highlight minimum length;
setting a highlight maximum length; and
discarding a user highlight of the plurality of user highlights having:
a length less than the highlight minimum length; or
a length greater than the highlight maximum length.

13. The non-transitory computer-readable storage media of claim 11, the generating the first score for the start point and the second score for the end point based on at least two of the plurality of user highlights further comprising:
designating the first start point as a first start point origin position;
designating the second start point as a second start point origin position;
designating the first end point as a first end point origin position; and
designating the second end point as a second end point origin position;
wherein:
the first start point weight for the at least the first position is based at least in part on a positional distance between the first start point origin position and the at least the first position;
the second start point weight for the at least the first position is based at least in part on a positional distance between the second start point origin position and the at least the first position;
the first end point weight for the at least the second position is based at least in part on a positional distance between the first end point origin position and the at least the second position; and the second end point weight for the at least the second position is based at least in part on a positional distance between the second end point origin position and the at least the second position.

14. The non-transitory computer-readable storage media of claim 11, wherein the determining the popular highlight further comprises:
generating a popular highlight score at least in part by summing the highest ranking start point position score and the highest ranking end point position score of the popular highlight.

15. The non-transitory computer-readable storage media of claim 11, further comprising instructions that when executed instruct a processor to perform acts comprising at least one of:
removing an overlapping user highlight, the overlapping user highlight being a user highlight of the plurality of user highlights, which overlaps the popular highlight;
combining two or more of the overlapping user highlights; or
removing an adjacent user highlight, the adjacent user highlight being a user highlight of the plurality of user highlights which have a start point an end point, or both within a pre-determined adjacency distance of the popular highlight.

16. A device comprising:
a processor;
a memory coupled to the processor;
a highlight acquisition module stored on the memory and configured to acquire a plurality of user highlights made to an electronic book by a plurality of users, an individual user highlight of the plurality of user highlights comprising a start point and an end point that denote an interval across two or more positions within the electronic book;
a highlight assessment module stored on the memory and configured to generate, for the individual user highlight of the plurality of user highlights, a first score for the start point and a second score for the end point based at least in part on at least two of the plurality of user highlights, generating the first score and the second score comprising:
determining a first start point weight, the first start point weight being a weight for a first start point of a first user highlight of the at least two of the plurality of user highlights for at least a first position of the two or more positions;
determining a second start point weight, the second start point weight being the weight for a second start point of a second user highlight of the at least two user highlights of the plurality of user highlights for the at least the first position of the two or more positions;
determining a first end point weight, the first end point weight being the weight for a first end point of the first user highlight of the at least two user highlights of the plurality of user highlights for at least a second position of the two or more positions;
determining a second end point weight, the second end point weight being the weight for a second end point of the second user highlight of the at least two user highlights of the plurality of user highlights for the at least the second position of the two or more positions;
calculating a start point position score for the at least the first position of the two or more positions by summing the first start point weight for the at least the first position of the two or more positions and the second start point weight for the at least the first position of the two or more positions;
calculating an end point position score for the at least the second position of the two or more positions by summing the first end point weight for the at least the second position of the two or more positions and the second end point weight for the at least the second position of the two or more positions;
a highlight ranking module stored on the memory and configured to rank:
the start point position score for the at least the first position of the two or more positions;
the end point position score for the at least the second position of the two or more positions; and
a highlight selection module stored on the memory and configured to designate a popular highlight according to the start point corresponding to a highest ranking start point position score and the end point corresponding to a highest ranking end point position score.

17. The device of claim 16, the highlight assessment module further configured to iterate the calculating the start point position score and the calculating the end point position score for a for a pre-determined number of positions.

18. The device of claim 16, the highlight assessment module further configured to:
set a highlight minimum length;
set a highlight maximum length; and
discard a user highlight of the plurality of user highlights having:
a length less than the highlight minimum length; or
a length greater than the highlight maximum length.

19. The device of claim 16, the generating the first score and the second score further comprising:
designating the first start point as a first start point origin position;
designating the second start point as a second start point origin position;
designating the first end point as a first end point origin position; and
designating the second end point as a second end point origin position;
wherein:
the first start point weight for the at least the first position is based at least in part on a positional distance between the first start point origin position and the at least the first position;
the second start point weight for the at least the first position is based at least in part on a positional distance between the second start point origin position and the at least the first position;
the first end point weight for the at least the second position is based at least in part on a positional distance between the first end point origin position and the at least the second position; and
the second end point weight for the at least the second position is based at least in part on a positional distance between the second end point origin position and the at least the second position.

20. The device of claim 16, wherein the highlight selection module is further configured to generate a popular highlight score at least in part by summing the highest ranking start point position score and the highest ranking end point position score.

21. The device of claim 16, further comprising a highlight processing module stored on the memory and configured to at least one of:
remove an overlapping user highlight, the overlapping user highlight being a user highlight of the plurality of user highlights, which overlaps the popular highlight;

combine two or more of the overlapping user highlights; or
remove an adjacent user highlight, the adjacent user highlight being a user highlight of the plurality of user highlights which has a start point, an end point, or both within a pre-determined adjacency distance of the popular highlight.

22. The device of claim 16, further comprising a display configured to present the popular highlight.

23. A system comprising:
a processor;
a non-transitory computer readable media coupled to the processor;
a highlight acquisition module stored on the non-transitory computer-readable media and configured to acquire a plurality of user highlights made to an electronic book by a plurality of users, an individual user highlight of the plurality of user highlights comprising a start point and an end point that denote an interval across two or more positions within the electronic book;
a highlight assessment module stored on the non-transitory computer-readable media and configured to:
generate, for the individual user highlight of the plurality of user highlights, a first score for the start point and a second score for the end point based at least in part on at least two user highlights of the plurality of user highlights, generating the first score and the second score comprising:
determining a first start point weight, the first start point weight being a weight for a first start point of a first user highlight of the at least two of the plurality of user highlights for at least a first position of the two or more positions;
determining a second start point weight, the second start point weight being the weight for a second start point of a second user highlight of the at least two user highlights of the plurality of user highlights for the at least the first position of the two or more positions;
determining a first end point weight, the first end point weight being the weight for a first end point of the first user highlight of the at least two user highlights of the plurality of user highlights for at least a second position of the two or more positions;
determining a second end point weight, the second end point weight being the weight for a second end point of the second user highlight of the at least two user highlights of the plurality of user highlights for the at least the second position of the two or more positions;
generate a start point position score for the at least the first position of the two or more positions by summing the first start point weight for the at least the first position of the two or more positions and the second start point weight for the at least the first position of the two or more positions;
generate an end point position score for the at least the second position of the two or more positions by summing the first end point weight for the at least the second position of the two or more positions and the second end point weight for the at least the second position of the two or more positions;
a highlight ranking module stored on the non-transitory computer-readable media and configured to rank:
the start point position score for the at least the first position of the two or more positions;
the end point position score for the at least the first position of the two or more positions; and
a highlight selection module stored on the non-transitory computer-readable media and configured to designate a popular highlight according to the start point corresponding to a highest ranking start point position score and the end point corresponding to a highest ranking end point position score.

24. The system of claim 23, further comprising a display configured to present the popular highlight.

25. The system of claim 23, the highlight assessment module further configured to:
set a highlight minimum length;
set a highlight maximum length; and
discard a user highlight of the plurality of user highlights having:
a length less than the highlight minimum length; or
a length greater than the highlight maximum length.

26. The system of claim 23, the generating the first score and the second score further comprising:
designating the first start point as a first start point origin position;
designating the second start point as a second start point origin position;
designating the first end point as a first end point origin position; and
designating the second end point as a second end point origin position;
wherein:
the first start point weight for the at least the first position based at least in part on a positional distance between the first start point origin position and the at least the first position;
the second start point weight for the at least the first position based at least in part on a positional distance between the second start point origin position and the at least the first position;
the first end point weight for the at least the second position based at least in part on a positional distance between the first end point origin position and the at least the second position; and
the second end point weight for the at least the second position based at least in part on a positional distance between the second end point origin position and the at least the second position.

27. The system of claim 23, wherein the highlight selection module is further configured to generate a popular highlight score based at least in part on a sum of the highest ranking start point position score and the highest ranking end point position score of the popular highlight.

28. The system of claim 23, further comprising a highlight processing module stored on the memory and configured to at least one of:
remove an overlapping user highlight, the overlapping user highlight being a user highlight of the plurality of user highlights which overlaps the popular highlight;
combine two or more of the overlapping user highlights; or
remove an adjacent user highlight, the adjacent user highlight being a user highlight of the plurality of user highlights which has a start point, an end point, or both within a pre-determined adjacency distance of the popular highlight.

* * * * *